Feb. 3, 1970    E. D. WISEMAN    3,493,276
ROTATABLE PLUG BEARING

Original Filed May 31, 1966

INVENTOR
Everett Dean Wiseman
BY Herbert Q. Minturn
ATTORNEY

Feb. 3, 1970  E. D. WISEMAN  3,493,276
ROTATABLE PLUG BEARING
Original Filed May 31, 1966  2 Sheets-Sheet 2
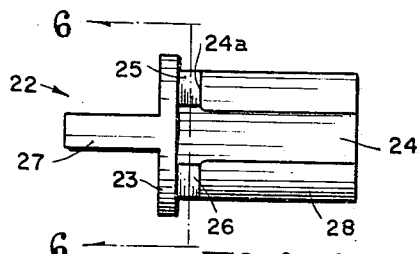
Fig. 5
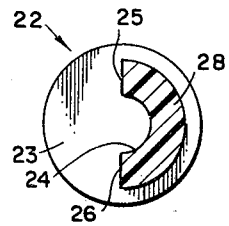
Fig. 6
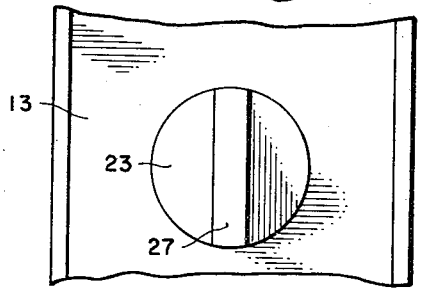
Fig. 7
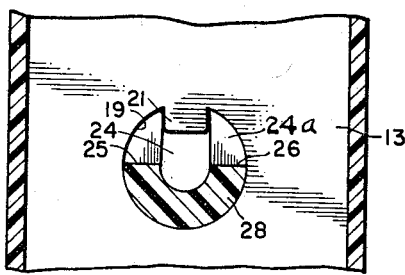
Fig. 8
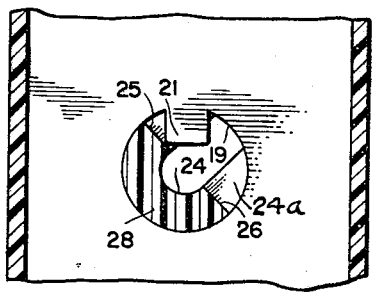
Fig. 8a
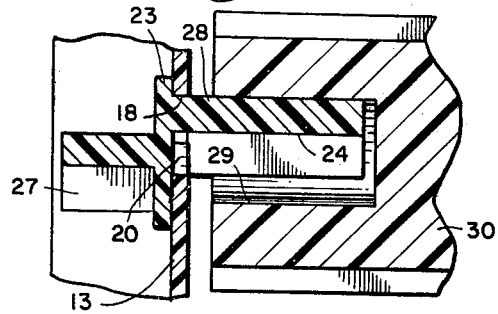
Fig. 9
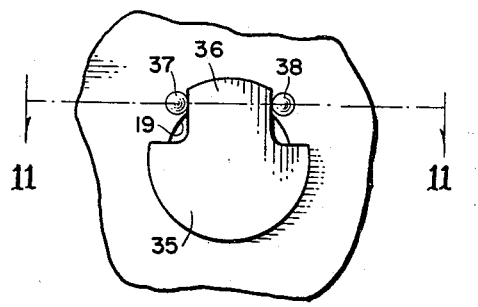
Fig. 10
Fig. 11
INVENTOR
Everett Dean Wiseman
BY
Herbert Q. Minturn
ATTORNEY United States Patent Office 3,493,276
Patented Feb. 3, 1970

3,493,276
ROTATABLE PLUG BEARING
Everett D. Wiseman, Columbus, Ind., assignor to Vernco Corporation, Columbus, Ind.
Continuation of abandoned application Ser. No. 555,056, May 31, 1966. This application May 20, 1968, Ser. No. 736,521
Int. Cl. F16c *13/00, 35/00, 9/00*
U.S. Cl. 308—20
3 Claims

ABSTRACT OF THE DISCLOSURE

A plug bearing slidingly insertable through a hole in a supporting rail into which hole a tongue of the thickness of the rail extends less than the radius of the hole; the bearing has a slot longitudingly receiving the tongue from one end; a head exceeding the diameter of the bearing and fixed on an end of the bearing closing the opposite end of the slot; a transverse slot crossing the longitudinal slot at said head with a width substantially that of the tongue, the head providing one face of the transverse slot; the transverse slot centering on and traversing the longitudinal slot for approximately one-half of the bearing circumference; the sides of the transverse slot snugly engaging opposite sides of the tongue upon rotation of the bearing; the floor of the transverse slot striking the tongue limiting bearing rotation; the bearing extending a distance from the rail; and a member having a bore therein receiving the bearing extension for a full 360 degrees of rotation therearound.

This application is a continuation of my pending application filed May 31, 1966, Ser. No. 555,056 for Rotatable Plug Bearing, which is now abandoned.

This invention is of a new structure in a portable humidifier providing a removable bearing for supporting and carrying rotatable rolls, around which a flexible, open cellular belt is carried to lift water from a reservoir, and through which belt, a current of air is directed to carry water laden air into a space to be humidified.

Specifically, the invention involves a cylindrical plug having a longitudinal slot, a head, and a transverse slot adjacent the head, whereby the plug is insertable through a circular hole in a relatively stationary side member and into a bore in the end of a roll around which the water elevating belt is entrained. There is a fixed tongue extending from the margin of the hole, which tongue enters the plug slot, and axial rotation is had by reason of the transverse slot receiving the tongue. This rotation of the plug is limited by the bottom of this transverse slot striking the tongue upon a limited degree of plug rotation to present a solid circumferential portion beyond said slot of the plug to be directed radially of the roll bore on that side thereof toward which the thrust of the belt is directed.

The rolls, one at the top and one at the bottom of a frame including two outer side members, carry the water laden belt. This assembly is generally termed a pad and as such is readily removable from the humidifier. The lower roll is immersed in water. In many locations of use of the humidifier, minerals carried in the local water supply will, in time become encrusted within and on the walls of the cellular-like belt structure, thereby tending to decrease the water lifted by the belt. Consequently, the belt has to be removed from the rolls from time to time to permit cleansing of the belt, necessitating the feature of the easy and quick disconnection of the rotatable rolls from the two side members as presented by the invention illustrated and described herein.

Further objects and advantages of the invention, including the simplicity of installation and removal of the bearing members, and low cost of manufacture and assembly, will become apparent to those versed in the art in the following description in which reference is made to the accompanying drawings, in which FIG. 1 is a view in elevation and in partial section of a pad assembly as viewed from the forward side thereof in respect to the front side of a humidfier (not shown);

FIG. 5 is a view in side elevation of a plug bearing in approximate full size;

FIG. 6 is a view in vertical section on the line 6—6 in FIG. 5;

FIG. 7 is an outside view in side elevation of a short length of the pad side member with a plug member inserted therethrough;

FIG. 8 is a sectional view on the line 8—8 in FIG. 1, on an enlarged scale;

FIG. 9 is a vertical sectional view on the line 9—9 in FIG. 2, on an enlarged scale;

FIG. 10 is a view in side elevation of a fragmentary length of a pad side member showing a modified form of plug bearing head; and FIG. 11 is a detail in section on the line 11—11 in FIG. 10.

Figure 3:
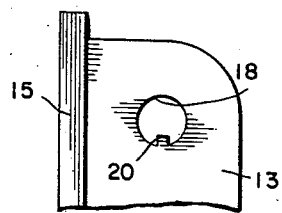
FIG. 3 is a view in detail in side elevation of the upper left end portion of the pad, with a roll bearing removed.
Figure 4:
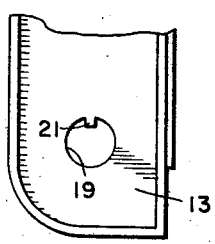
FIG. 4 is a view in detail in side elevation of the left lower end of the pad, with a roll bearing removed.

A pad generally designated by the numeral 12 comprises a pair of side rails 13 and 14 spaced apart and tied together by top and bottom members 15 and 16, and an intermediate member 17. The rail 13 has a circular hole 18 therethrough adjacent the top end thereof and a hole 19 therethrough adjacent the lower end, FIGS. 3 and 4. A tongue 20 extends upwardly from the lower portion of the margin of the hole 18, and a tongue 21 extends downwardly from the top portion of the margin of the hole 19. As indicated in FIGS. 3, 4 and 9, the tongues 20 and 21 have thicknesses equivalent to those of the rails 13 and 14. The radial lengths of these tongues 20 and 21, are as indicated to be less than the radii of the plugs.

A plug bearing generally designated by the numeral 22, and hereinafter referred to as a plug 22, is formed to have a generally cylindrical body 28 which will rotatably enter either hole 18 or 19 which have the same diameter. A head 23, plate-like in nature, has an external diameter exceeding that of the holes to serve as a limiting stop limiting the passage of the body of the plug 22 through the holes.

The plug 22 has a slot 24 entering longitudinally of the plug and extending throughout its length and to a diametrical depth exceeding the radial dimension of the plug, FIGS. 8 and 8a. The slot 24 has a width slightly exceeding the circumferential or lateral width of the tongues 20 and 21. Then the plug 22 has a transverse slot 24a intersecting the slot 24 and slidingly receiving the tongue 21 at the head 23 and having a radial depth equal approximately to the length of a radius of the plug 22. This transverse slot 24a provides two spaced bottom lands 25 and 26, one on each side of the slot 24 which terminates at the head 23. A grip 27, shown as a rectangular member, integral with the plug head 23 extends outwardly as a means for rotating the plug 22.

In FIG. 8, the plug body 28 has been inserted through the bottom hole 19 with the tongue 21 entering the slot 24 to permit the body 28 to travel through the hole 19 the full length of the body of the plug. In this plug travel, the body 28 enters a bore 29 in the end of a belt carrying roll 30, as in FIG. 9, where the body 28 has been entered through the top hole 18 as an example. The grip 27 is in the vertically aligned position during the inward travel of the body 28 through the hole 18 or 19 as the case may be, and on into the bore 29 of the roll 30. In this position, the plug 22 may be axially rotated, preferably clockwise. In this rotation, the land 25 comes against the side edge of the tongue 21 (lower hole 19) and the plug 22 may be rotated by the member 27 no farther and neither can the plug 22 when in that position, be pulled longitudinally for disengagement from the roll bore 29.

Figures 1, 2:
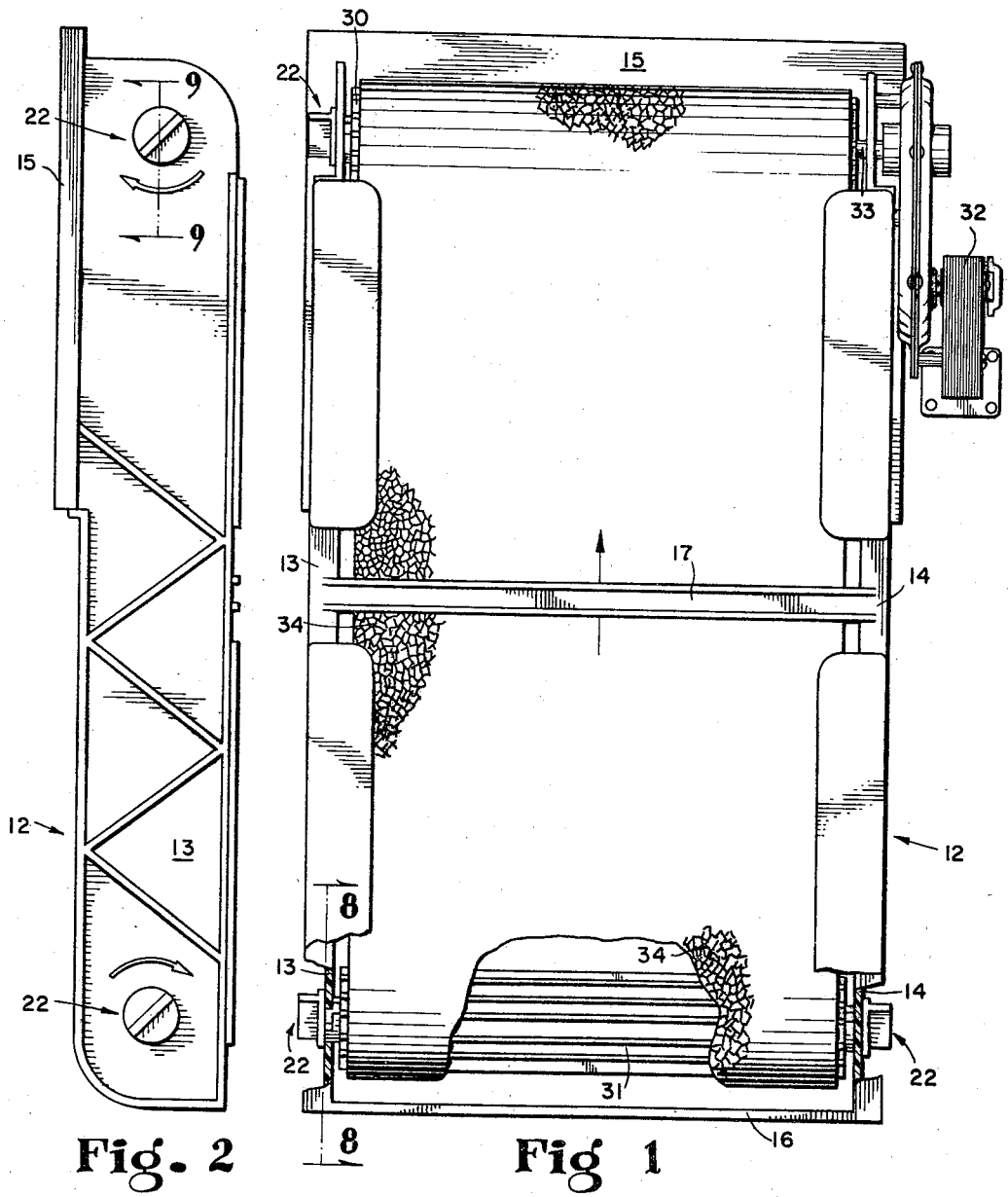
FIG. 2 is a view in lefthand side elevation of the pad, in reference to FIG. 1.

There are two rolls 30 and 31 located respectively at top and bottom portions and between the side members 13 and 14. The top roll 30 is driven rotatively by a motor 32 through a drive shaft 33 extending through the side member 14 and in driving connection in the end of the roll 30, FIG. 1. This roll 30 is thus supported at its righthand end (FIG. 1) by the motor driven shaft 33. The opposite end of the roll 30 is supported by a plug 22 as has been described. The lower roll 31 is supported at each of its ends by a plug 22.

An endless belt 34 is carried around the rollers in a sufficiently taut manner to cause the belt to be driven by the upper roll 30.

The tongue 20 in the top hole 18 is presented to extend upwardly to have a cylindrical surface of the body 28 to one side of the entrance to the slot 24 bear against the upper side of the bore 29 since the thrust of the roll is primarily downward. The tongue 21 in the lower hole 19 is upwardly directed requiring the cylindrical surface of the body 28 to one side of the entrance to the slot 24 to be directed downwardly toward the lower side of the bore in the roll 31. The belt 34 is resilient and somewhat elastic to permit the rolls 30 and 31 to be inserted between the up and down flights and to receive the plugs 22 in the roll end bores 29.

Thus the structure as illustrated and described provides a body 28 normally stationary, in its position, axially extending from a rail into a bore entering an end of the rotatable roll. In this manner, the body 28 is a cantilever member supported against drooping or deviating from its normal extension from the rail to which the plug is attached. This normal operative positioning of the plug 22 in each instance is had by reason of the head 23 bearing against the outsides of the rail 13 and 14 which one or the other of the faces of that slot 24a contacts the tongue 20 or 21, as the case may be, on that side of the tongue on the rail side opposite to the head contacting side. This normal position is maintained by reason of the land of the slot 24a selectively bearing against a side of the tongue. As above indicated the positioning of the tongues 20 and 21 respectively extend upwardly and downwardly.

To remove the belt 34, the three plugs 22 are rotated counterclockwise to align the slots 24 with the tongues 20 and 21 as determined by the members 27 coming into vertical positions as in FIG. 7, whereupon the plugs may be axially withdrawn through the side members freeing the rolls to allow the belt 34 to be removed. The upper roll 30 has that axial length, which upon withdrawal of the plug 22 on the left side, will permit the roll 30 to be shifted to the left to slide off the drive shaft 33. Both rolls 30 and 31 preferably have corrugated surfaces over which the belts travel. Both the rolls and the plugs 22 are preferably made of a plastic material resisting erosion due to chemicals in the water.

A slightly modified form of head 27 is illustrated in FIGS. 10 and 11, suitable for use where the finger grip member 27 is not desirable. In this modification, a plate 35 (integral with the body 28) has a tongue 36 extending approximately in the plane of the plate 35, and as a locator of the slot 24, from a zone intermediate the lands 25 and 26 and the outer circumference of the body 28. This tongue 36 normally lies between two rounded end posts 37 and 38 carried by the side member 13 or 14 as the case may be. The tongue 36 has sufficient elasticity and the posts 37 and 38 are short enough to permit the tongue to be shifted thereover in either direction and snap back against the side member. While rotating the plug in the direction of rotation of the roll is normal insurance against reverse rotation of a plug to permit it to be accidentally worked out of the roll bore, the modified form provides a positive prevention of rotation of a plug once it is turned to its proper position.

The plugs require no oil lubrication between the body 28 and the wall of the roll bore.

While I have herein described my invention in the best form as now known to me, structural changes may be made without departing from the spirit of the invention.

I claim:
1. The combination of
   a 360 degree rotatable roll having a bore entering therein centered on an axis of roll rotation;
   a supporting rail having a hole therethrough;
   a tongue in said hole having a radial length less than the radius of the hole;
   a plug rotatably entering said hole and having a cylindrical body length extending beyond the hole and terminating within said roll bore, and about which length the roll may rotate;
   a head on said plug exceeding the diameter of and bearing against the margin of the rail hole limiting the extent of said length therefrom;
   said body length having a longitudinal slot therealong entering from the end within said bore and terminating at said head;
   the width of the slot slidingly receiving said tongue;
   said body having a transverse slot opening by one side along said head from said longitudinal slot, the transverse slot further having a width extending from said head to a face spaced from the head to receive said tongue slidingly between said head and said face;
   said transverse slot having a bottom planar land extending from at least one side of the longitudinal slot; and
   said head and face snugly retaining said tongue therebetween upon rotation of said plug placing said land against said tongue.
2. The structure of claim 1, in which
   said transverse slot has a depth radially of the plug exceeding the radial length of said tongue.
3. The structure of claim 1, in which there is
   a stop on said rail and said head rides elastically over the stop to retain said land against said tongue.

References Cited

UNITED STATES PATENTS 3,053,368   9/1962   Klahn _____ 308—20 X

FOREIGN PATENTS 1,232,856   4/1960   France.

CARROLL B. DORITY, Jr., Primary Examiner

U.S. Cl. X.R.

308—22